(12) United States Patent
Arima

(10) Patent No.: US 8,787,010 B2
(45) Date of Patent: Jul. 22, 2014

(54) INFORMATION PROCESSING APPARATUS

(75) Inventor: Kiyokuni Arima, Nagano (JP)

(73) Assignee: Sony Corporation (JP)

( * ) Notice: Subject to any disclaimer, the term of this patent is extended or adjusted under 35 U.S.C. 154(b) by 252 days.

(21) Appl. No.: 13/329,686

(22) Filed: Dec. 19, 2011

(65) Prior Publication Data
US 2012/0162888 A1   Jun. 28, 2012

(30) Foreign Application Priority Data

Dec. 28, 2010  (JP) ................ P2010-291982

(51) Int. Cl.
G06F 1/16 (2006.01)
H05K 5/00 (2006.01)
H05K 7/00 (2006.01)
G06F 1/20 (2006.01)
H05K 7/20 (2006.01)

(52) U.S. Cl.
USPC ............ 361/679.28; 361/679.06; 361/679.07; 361/679.09; 361/679.27

(58) Field of Classification Search
USPC ............. 361/679.01, 679.02, 679.04, 679.06, 361/679.07, 679.08, 679.09, 679.11, 361/679.12, 679.15, 679.2, 679.27, 679.28; 455/575.3
See application file for complete search history.

(56) References Cited

U.S. PATENT DOCUMENTS 7,724,519 B2   5/2010 Asawa et al.
2010/0071155 A1*  3/2010 Ueyama et al. ................. 16/250

FOREIGN PATENT DOCUMENTS

JP   2006-079265 A   3/2006

* cited by examiner

Primary Examiner — Hoa C Nguyen
Assistant Examiner — Binh Tran
(74) Attorney, Agent, or Firm — Lerner, David, Littenberg, Krumholz & Mentlik, LLP

(57) ABSTRACT

An information processing apparatus is disclosed which can be enhanced in degree of freedom in design. A hinge mechanism is provided which includes a first shaft structure provided in an exposed state on a second face of a main body section, a second shaft structure provided on a display section, and a shaft connection section which connects the first and second shaft structures to each other. The hinge mechanism pivotably connects the display section to the main body section between a first position at which a screen of the display section is opposed to a first face of the main body section and a second position at which the screen is inclined with respect to the first face of the main body section such that the center of the pivotal motion of the display section varies during the pivotal motion.

3 Claims, 15 Drawing Sheets

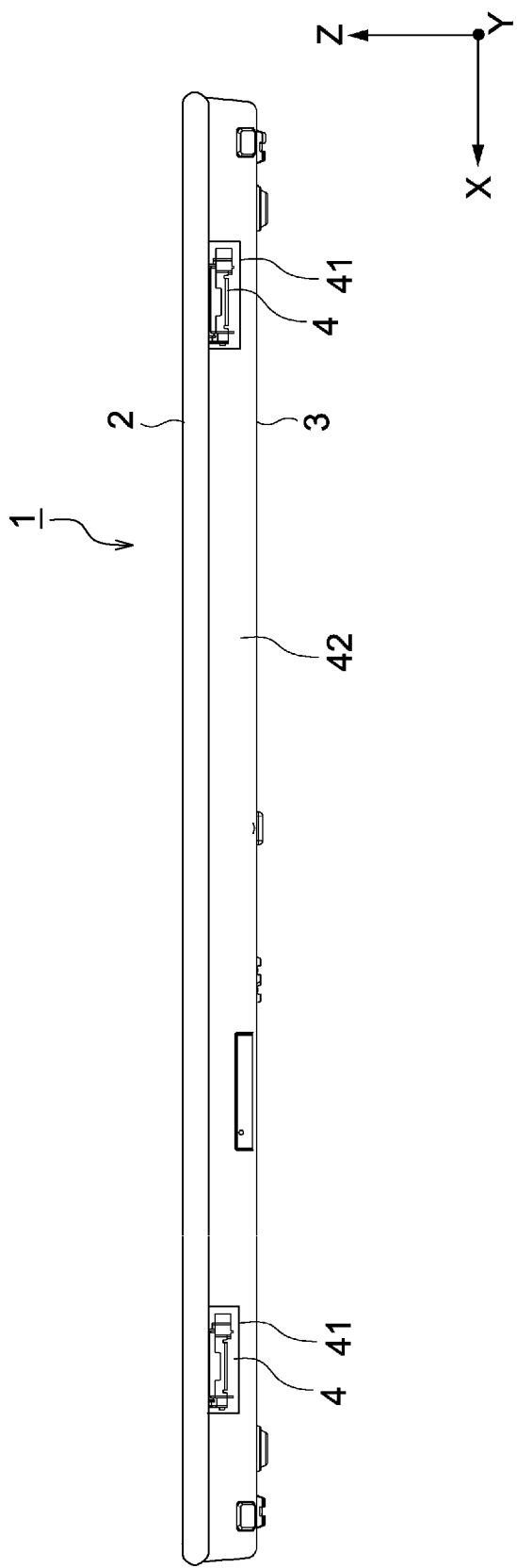

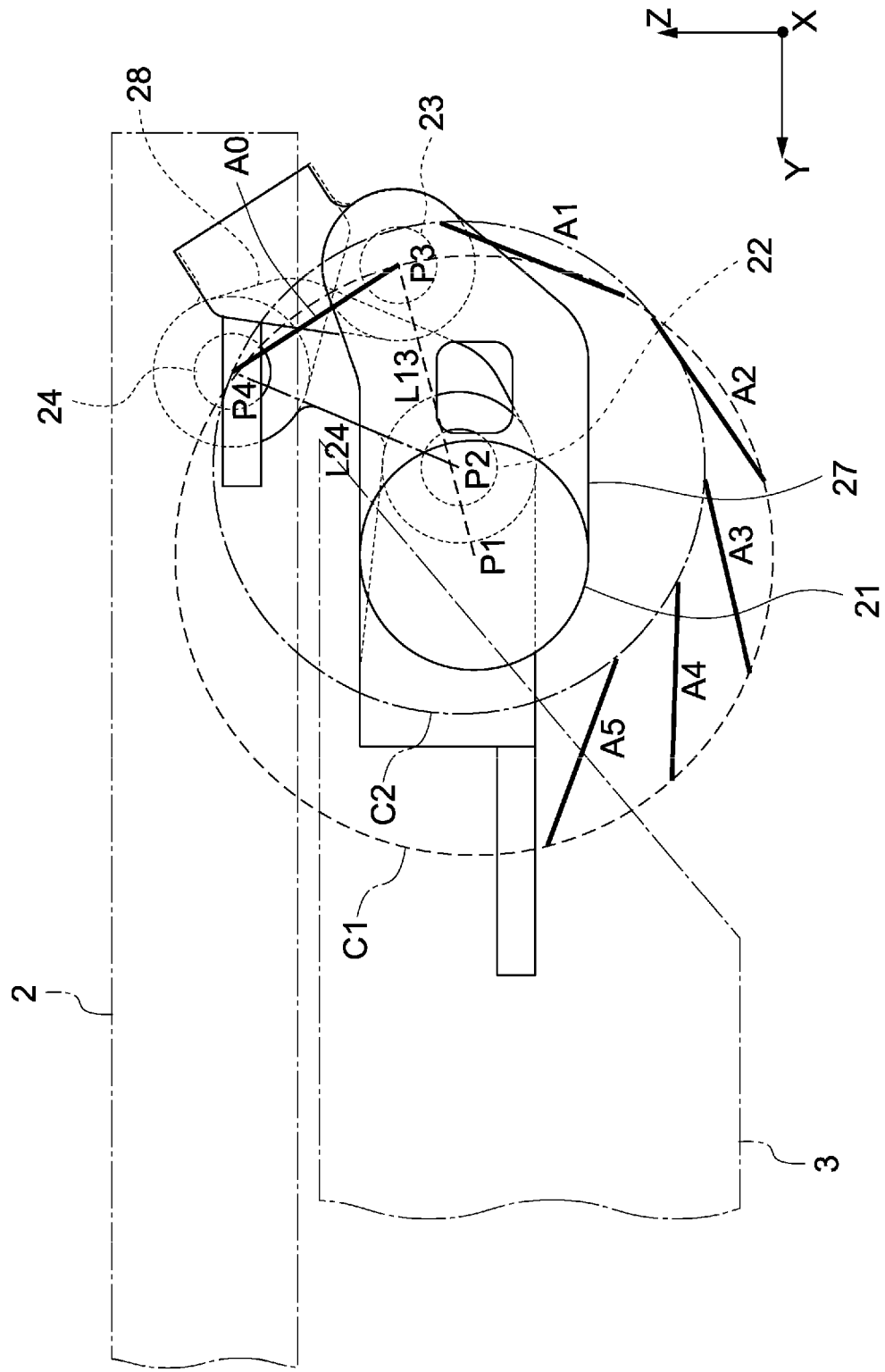

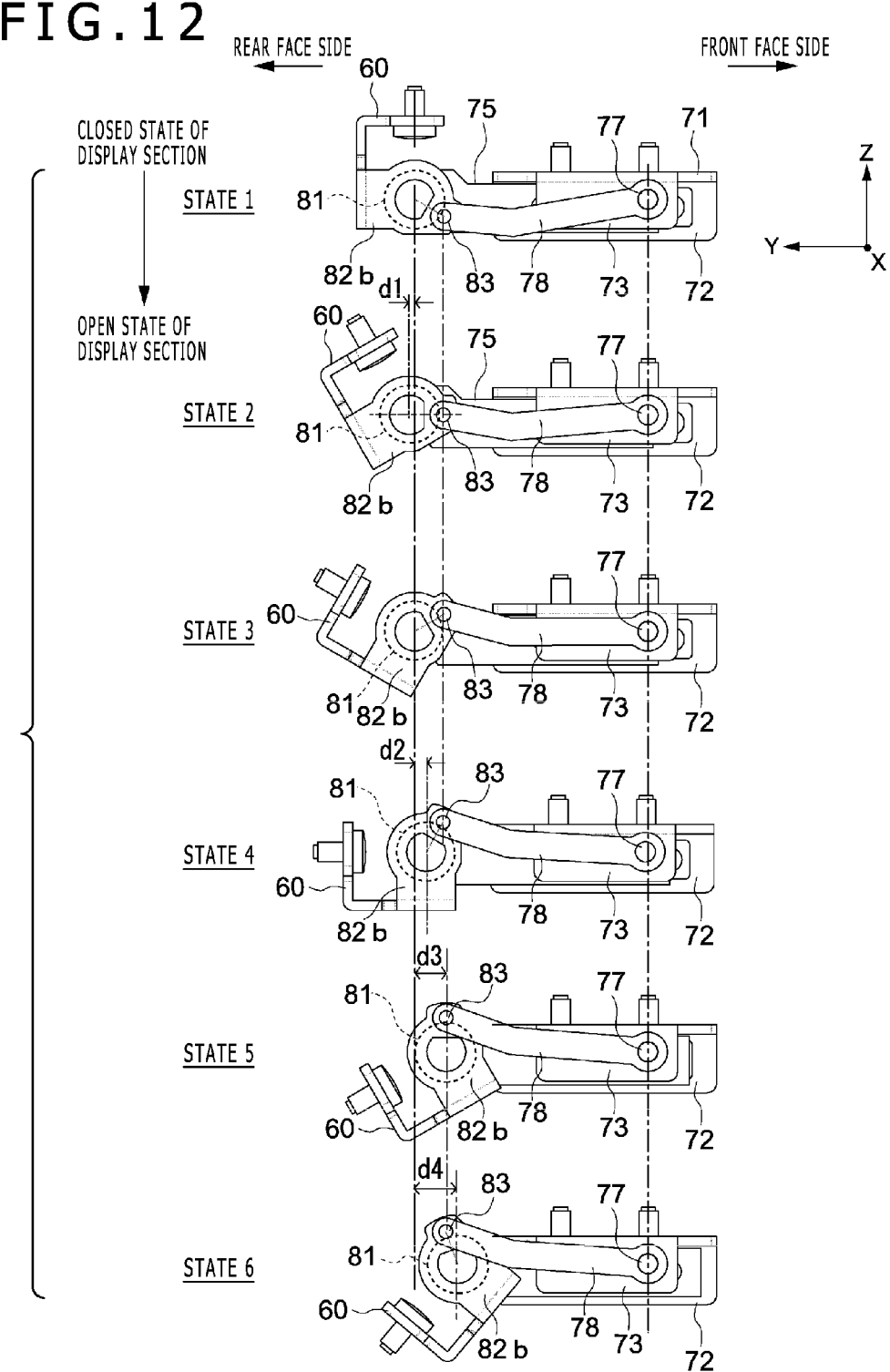

INFORMATION PROCESSING APPARATUS

CROSS-REFERENCE TO RELATED APPLICATION

The present application claims priority from Japanese Patent Application No. JP 2010-291982 filed in the Japanese Patent Office on Dec. 28, 2010, the entire content of which is incorporated herein by reference.

BACKGROUND

The technology disclosed herein relates to a foldable information processing apparatus wherein a display section is pivotably mounted on a main body section.

An information processing apparatus such as a notebook type personal computer is frequently configured such that a display section having a display unit and an apparatus main body are connected to each other by a hinge mechanism. The apparatus body has mounted thereon principal hardware parts of the computer such as a keyboard, a Central Processing Unit (CPU) and a storage device. In an information processing apparatus of the type described, the display section is pivotally movable with respect to the apparatus main body by a manual operation of a user. Particularly, the display section is pivotally moved between a position at which the display section covers an upper face of the apparatus main body and another position at which the display section opens the upper face of the apparatus main body and a display face thereof is erected uprightly at an optimum angle as viewed from the user. An information processing apparatus of the type described is disclosed, for example, in Japanese Patent Laid-Open No. Hei 2006-079265, particularly in paragraphs 0021 and 0022 and FIGS. 1 and 2.

The hinge mechanism adopted in an information processing apparatus of the type described is usually provided in a state in which it is partly exposed to an interior side end portion of the apparatus main body such that the display section can be pivoted on the apparatus main body. For example, in the information processing apparatus disclosed in the document mentioned above, a configuration for holding a pivot shaft provided on the apparatus main body for rotation by means of bearing elements of the display section is adopted in order to obtain a suitable range of pivotal motion of the display section.

SUMMARY

However, as described in the document mentioned above, in an information processing apparatus such as a popular notebook type personal computer, the hinge section is exposed to the interior of the upper face of the main body section of the information processing apparatus. This makes a cause of disturbing the degree of freedom in design of the upper face of the main body section of the information processing apparatus.

Therefore, it is desirable to provide an information processing apparatus which can be enhanced in degree of freedom in design.

According to the technology disclosed herein, there is provided an information processing apparatus including a main body section having a first face defined by a plurality of sides and having a keyboard disposed thereon and a second face which shares one of the sides of the first face, a display section having a third face on which a screen is disposed, and a hinge mechanism including a first shaft structure provided in an exposed state on the second face of the main body section, a second shaft structure provided on the display section and a shaft connection section adapted to connect the first shaft structure and the second shaft structure to each other, the hinge mechanism pivotably connecting the display section to the main body section between a first position at which the third face of the display section is opposed to the first face of the main body section and a second position at which the third face is inclined by a first predetermined angle with respect to the first face such that the center of the pivotal motion of the display section varies in response to the pivotal motion of the display section.

In the information processing apparatus, the first shaft structure is provided in an exposed state on the second face of the main body section, and the hinge mechanism pivotably connects the display section to the main body section between the first position and the second position while the center of the pivotal motion of the display section varies in response to the pivotal motion of the display section. Consequently, the hinge mechanism can be structured such that the first shaft structure, which is a part of the hinge mechanism on the main body section side, is connected to the second shaft structure, which is a part of the hinge mechanism on the display section side, only on the second face side of the main body section. In other words, the hinge mechanism can be configured so as not to be exposed to the first face of the main body section. Since the hinge mechanism is not exposed to the upper face of the main body section, the hinge mechanism is not observed from the user who is utilizing the information processing apparatus. Consequently, the sense of quality of the entire information processing apparatus is enhanced. Further, since the space in which the hinge mechanism is to be exposed on the first face of the main body section can be eliminated, the space in which different parts such as a light emitting diode (LED) lamp or a button are to be disposed can be increased. Consequently, the degree of freedom in design of the information processing apparatus for which miniaturization is demanded can be enhanced.

The information processing apparatus may be configured such that the second face of the main body section is a tapered face which retreats as the distance from the first face increases, and when the display section is at the second position, the third face is opposed in a parallel relationship to the tapered face. With the information processing apparatus, when the display section is open, the gap between the display section and the main body section can be minimized. Consequently, the design property is improved.

The information processing apparatus may further include accommodation sections individually provided on the second face of the main body section and the third face of the display section and adapted to cooperate, when the display section is at the second position, with each other to form one space in which the first shaft structure, second shaft structure and shaft connection section are accommodated. With the information processing apparatus, the second face of the main body section and the third face of the display section are not disturbed by the parts of the hinge mechanism but can be superposed with each other with a minimum clearance left therebetween.

The information processing apparatus may be configured such that the first shaft structure includes a first shaft and a second shaft having axes whose positions are displaced from each other; the second shaft structure includes a third shaft and a fourth shaft having axes whose positions are displaced from each other; the shaft connection section includes a first arm adapted to connect the first shaft and the third shaft to each other and a second arm adapted to connect the second shaft and the fourth shaft to each other; and the distance between the axes of the first shaft and the second shaft and the distance between the axes of the second shaft and the fourth shaft are different from each other. With the information processing apparatus, the locus of pivotal motion and the posture for each pivoted position of the display section can be controlled.

In summary, the disclosed technology can enhance the degree of freedom in design of an information processing apparatus of the type wherein a display section can be pivoted with respect to a main body section.

The above and other features and advantages of the disclosed technology will become apparent from the following description and the appended claims, taken in conjunction with the accompanying drawings in which like parts or elements denoted by like reference characters.

BRIEF DESCRIPTION OF THE DRAWINGS

FIG. 4 is a rear elevational view of the information processing apparatus shown in FIG. 2;

FIG. 8 is a schematic view showing a locus of pivotal movement of the display section through the hinge mechanism of FIGS. 5A to 5E;

FIG. 12 is side elevational views illustrating operation of the hinge mechanism of FIG. 10.

DETAILED DESCRIPTION OF THE PREFERRED EMBODIMENT

In the following, an information processing apparatus according to an embodiment of the technology disclosed herein is described.

Embodiment

The present embodiment relates to an information processing apparatus which includes a main body section in which various electronic devices for information processing such as a central processing unit, a main memory, a storage device and a keyboard unit are built, a display section including a display unit, and a hinge mechanism for pivotably connecting the display section within a predetermined angular range with respect to the main body section. As an information processing apparatus of the type described, a personal computer, a portable telephone set, a game machine, a player apparatus with a display unit and so forth are available. The hinge mechanism pivotably connects the display section to the main body section between a first position at which the display section covers an upper face of the main body section and a second position at which the display section opens the upper face of the main body section and a display face of the display section is erected uprightly at an optimum angle as viewed from a user.

In the following, the embodiment wherein the disclosed technology is applied to a personal computer of a type called notebook type is described in detail.

[Configuration of the Information Processing Apparatus]

Figure 1:
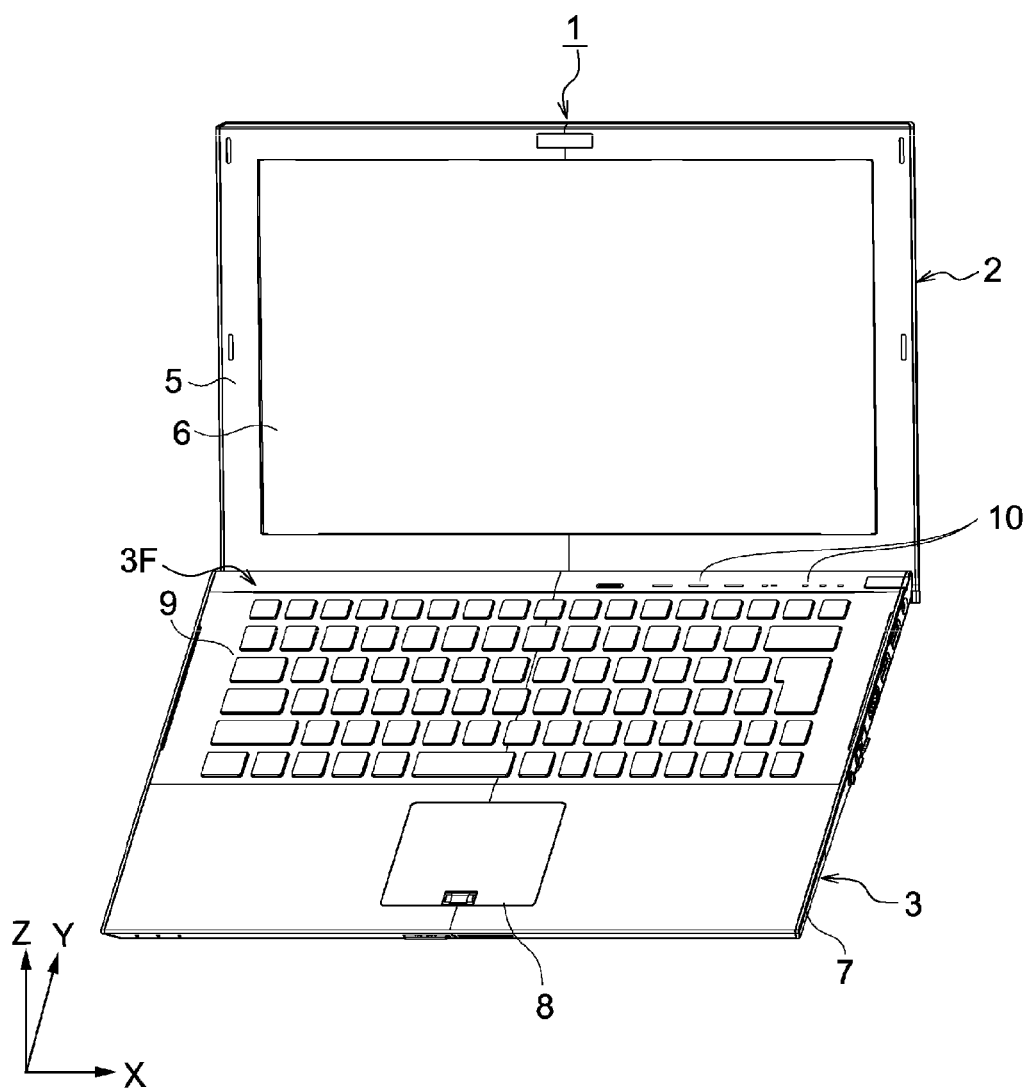
FIG. 1 is a perspective view of an information processing apparatus according to an embodiment of the disclosed technology in a state in which a display section is open.
Figure 2:
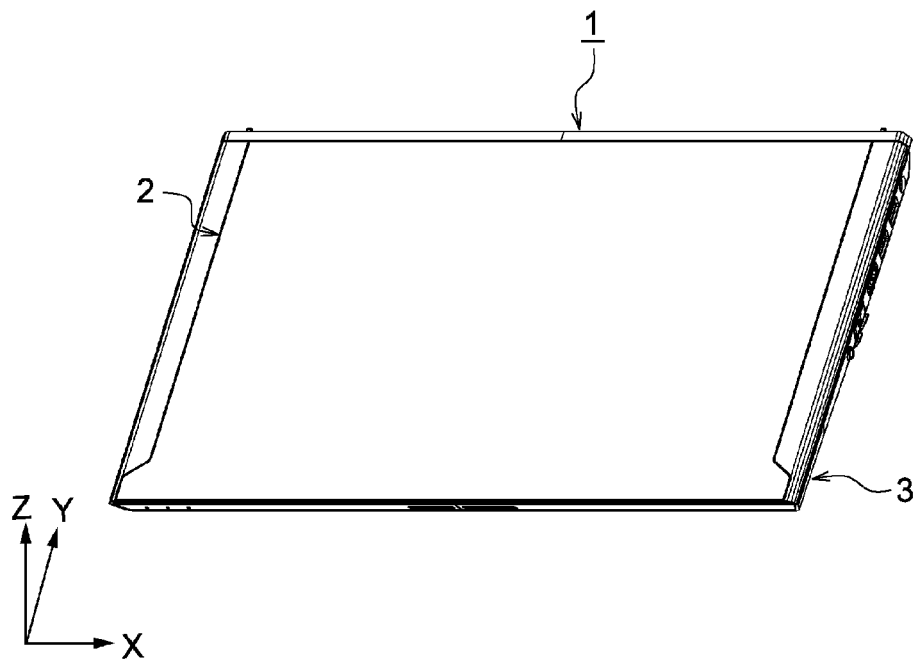
FIG. 2 is a perspective view of the information processing apparatus of FIG. 1 in another state in which the display section covers an upper face of a main body section.
Figure 3:
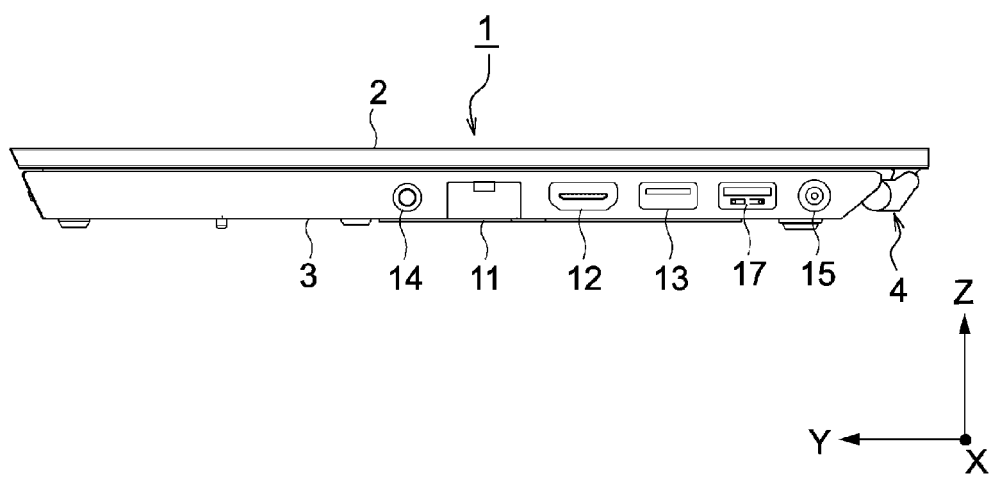
FIG. 3 is a right side elevational view of the information processing apparatus shown in FIG. 2.

FIG. 1 shows an appearance of the information processing apparatus according to the present embodiment and particularly shows the information processing apparatus in a state in which the display section is open with respect to the main body section. FIG. 2 shows the information processing apparatus of FIG. 1 but in another state in which the display section covers the upper face of the main body section. FIG. 3 shows the right side elevation of the information processing apparatus shown in FIG. 2. Here, the left and the right represent directions when the information processing apparatus is viewed from a user who uses the same. FIG. 4 shows the rear elevation of the information processing apparatus of FIG. 2. Three X, Y and Z axes taken as a reference for the information processing apparatus are defined in the following manner. In particular, X=a horizontal or leftward and rightward direction of the screen of the display section; Y=a depthwise direction of the information processing apparatus; and Z=a thicknesswise direction of the information processing apparatus.

Referring to FIGS. 1 to 4, the information processing apparatus 1 includes a display section 2, a main body section 3, and a hinge mechanism 4 for pivotably connecting the display section 2 and the main body section 3 to each other. The display section 2 can assume a position hereinafter referred to sometimes as closed position at which it covers an upper face or first face of the main body section 3. The display section 2 can assume another position hereinafter referred to sometimes as open position at which it opens the upper face of the main body section 3 and the display face of the display section 2 is erected uprightly at an optimum angle as viewed from a user of the information processing apparatus 1. The hinge mechanism 4 thus pivotably connects the display section 2 between the closed position and the open position to the main body section 3.

The display section 2 has a display section housing 5, and a display panel 6 configured, for example, from an LCD (Liquid Crystal Display) panel, an organic EL (electroluminescence) panel or a like panel. The surface of the display panel 6 is hereinafter referred to sometimes as "screen."

The main body section 3 has a main body section housing 7. A touch pad section 8, a keyboard unit 9, LEDs (Light Emitting Diodes) 10 for indicating a state of the information processing apparatus 1 and so forth, and like elements are provided on an upper face of the main body section housing 7. On a side face of the main body section housing 7, a network cable connector 11, an HDMI (High-Definition Multimedia Interface) connector 12, USB (Universal Serial Bus) connectors 13 and 17, a headphone output terminal 14, a power input terminal 15 and so forth are provided. Further, though not shown, an exhaust port, a display connector, a memory card slot and so forth are provided on an outer periphery of the main body section housing 7. In the main body section housing 7, hardware parts necessary for the configuration of a personal computer such as a CPU (Central Processing Unit), a main memory, a storage device and a mother board are built. For the storage device, for example, a HDD (Hard Disc Drive), a SSD (Solid State Drive) or the like is used.

Two such hinge mechanisms 4 are provided one by one at left and right positions of a rear face of the information processing apparatus 1. The two hinge mechanisms 4 have the same configuration. The rear face is a remote face as viewed from the user who uses the information processing apparatus 1. A direction opposite to the remote face is referred to as "front" or "forward."

Before the configuration of each hinge mechanism 4 is described, the configuration of a hinge attaching portion of the main body section 3 and the display section 2 is described.

[Configuration of the Hinge Attaching Portion]

Figure 5A:
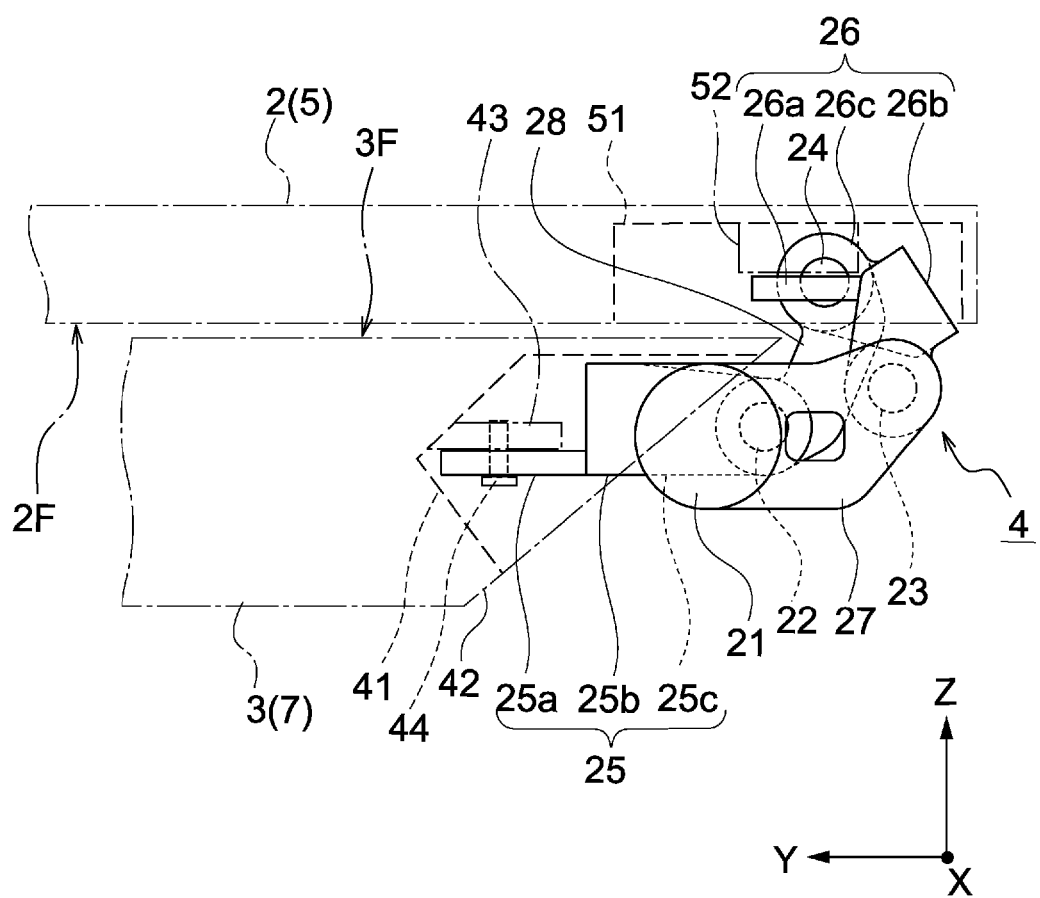
FIG. 5A is a side elevational view showing a hinge mechanism of the information processing apparatus of FIG. 1 in the state in which the display section is closed.

Referring to FIG. 5A, a first hinge accommodating portion 41 which can accommodate the hinge mechanism 4 is provided on a rear face or second face 42 of the main body section 3. The first hinge accommodating portion 41 particularly is a space assured on the rear face of the main body section 3. The rear face 42 of the first hinge accommodating portion 41 is tapered. In particular, the rear face 42 of the main body section 3 is a tapered face which gradually recedes from the upper face side toward the lower face side of the main body section 3. The taper angle of the rear face 42 is, for example, approximately 45 to 60 degrees with respect to the upper face of the main body section 3. The first hinge accommodating portion 41 is assured at a place retracted toward the inner side of the main body section 3 from the rear face 42 of the main body section 3 such that it can accommodate the hinge mechanism 4 on the interior side with respect to the tapered rear face 42. A first hinge fixing portion 43 for fixing the hinge mechanism 4 is provided in the first hinge accommodating portion 41. Thus, the hinge mechanism 4 is provided such that it is exposed to the rear face of the main body section 3.

Meanwhile, also on the display section 2, a second hinge accommodating portion 51 is provided which can cooperate with the first hinge accommodating portion 41 to accommodate the hinge mechanism 4. The second hinge accommodating portion 51 particularly is a space provided at a portion on the screen side of the display section 2. The second hinge accommodating portion 51 is provided at a place at which, when the display section 2 is in an open state as viewed in FIG. 5E, the second hinge accommodating portion 51 is hidden rearwardly by the main body section 3 and cannot be observed from the user. A second hinge fixing portion 52 for fixing the hinge mechanism 4 is provided in the second hinge accommodating portion 51.

[Configuration of the Hinge Mechanism 4]

Now, a configuration of the hinge mechanism 4 is described.

Figure 5B:
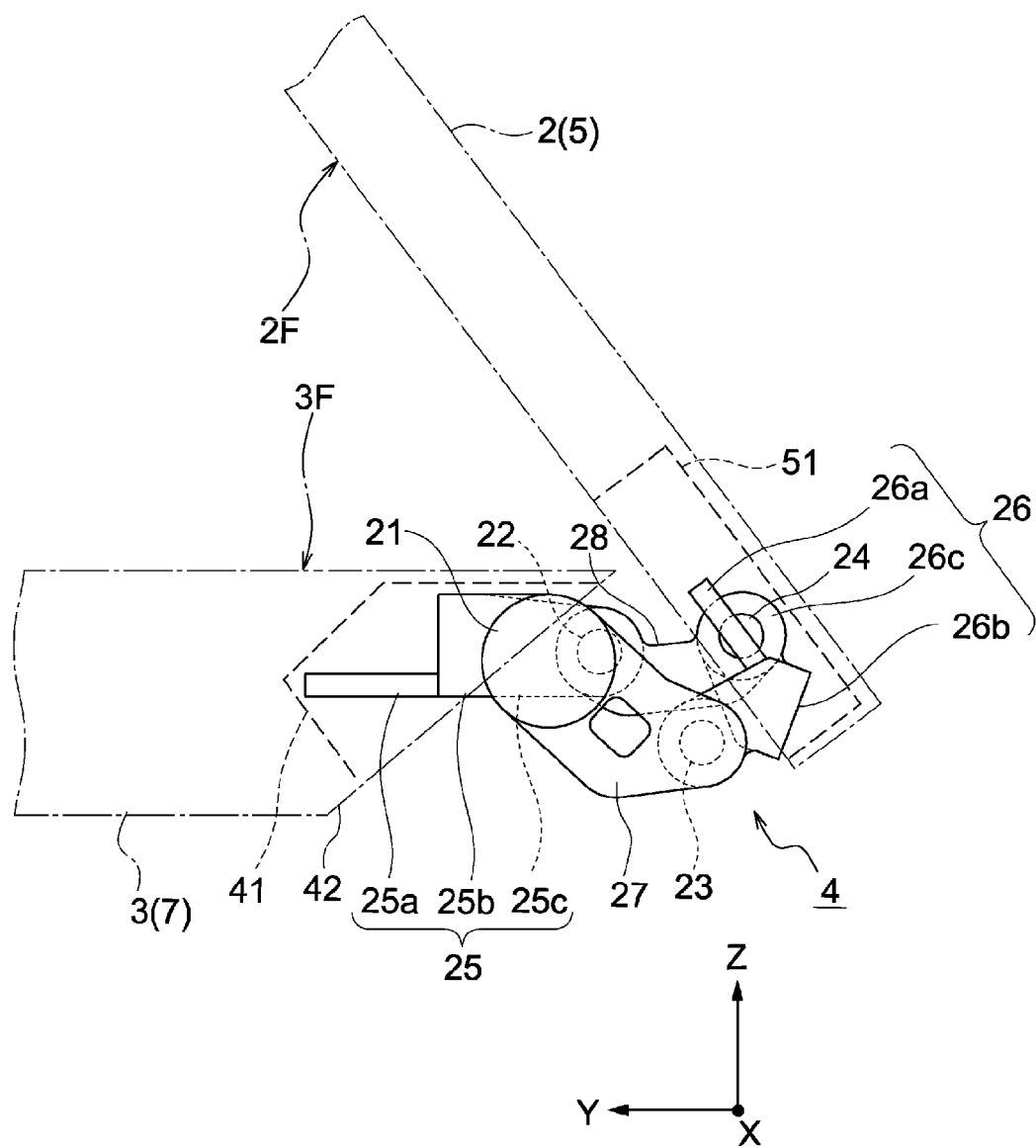
FIG. 5B is a side elevational view showing the hinge mechanism in a state at a point of time at which the display section of the information processing apparatus of FIG. 1 begins to be opened from the closed state.
Figure 5C:
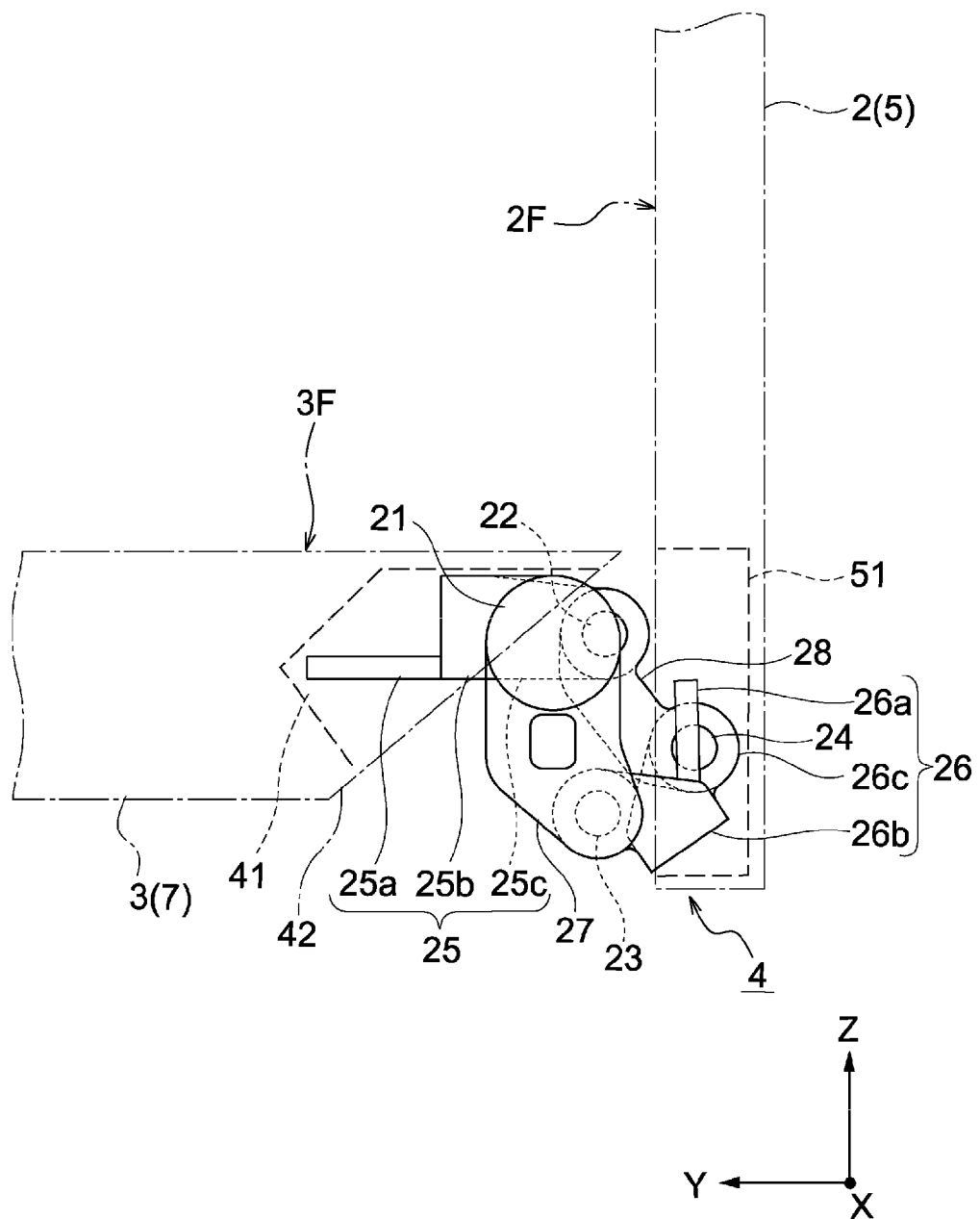
FIG. 5C is a side elevational view showing the hinge mechanism in a state in which the display section of the information processing apparatus of FIG. 1 is pivoted by an angle of approximately 90 degrees to an upright position with respect to the main body section.
Figure 5D:
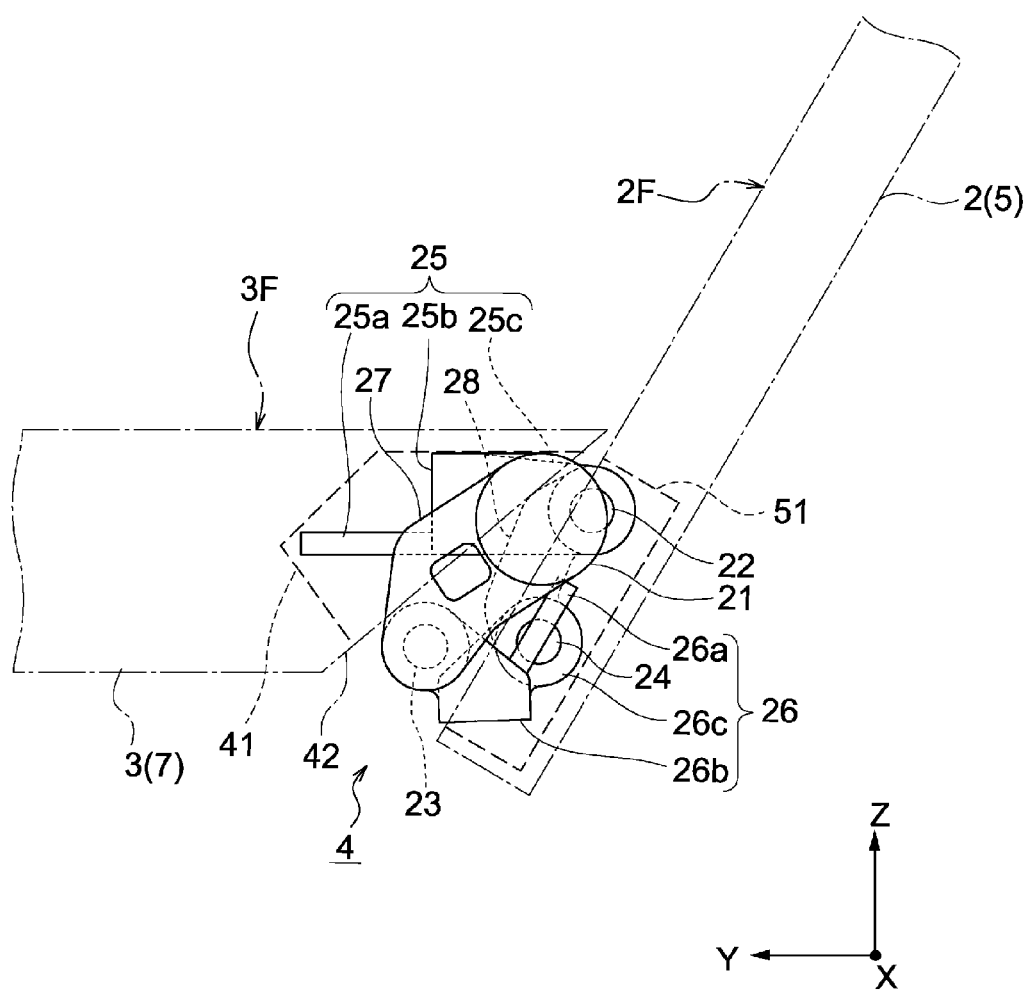
FIG. 5D is a side elevational view showing the hinge mechanism in a state in which the display section of the information processing apparatus of FIG. 1 is pivoted by a greater angle than approximately 90 degrees with respect to the main body section.
Figure 5E:
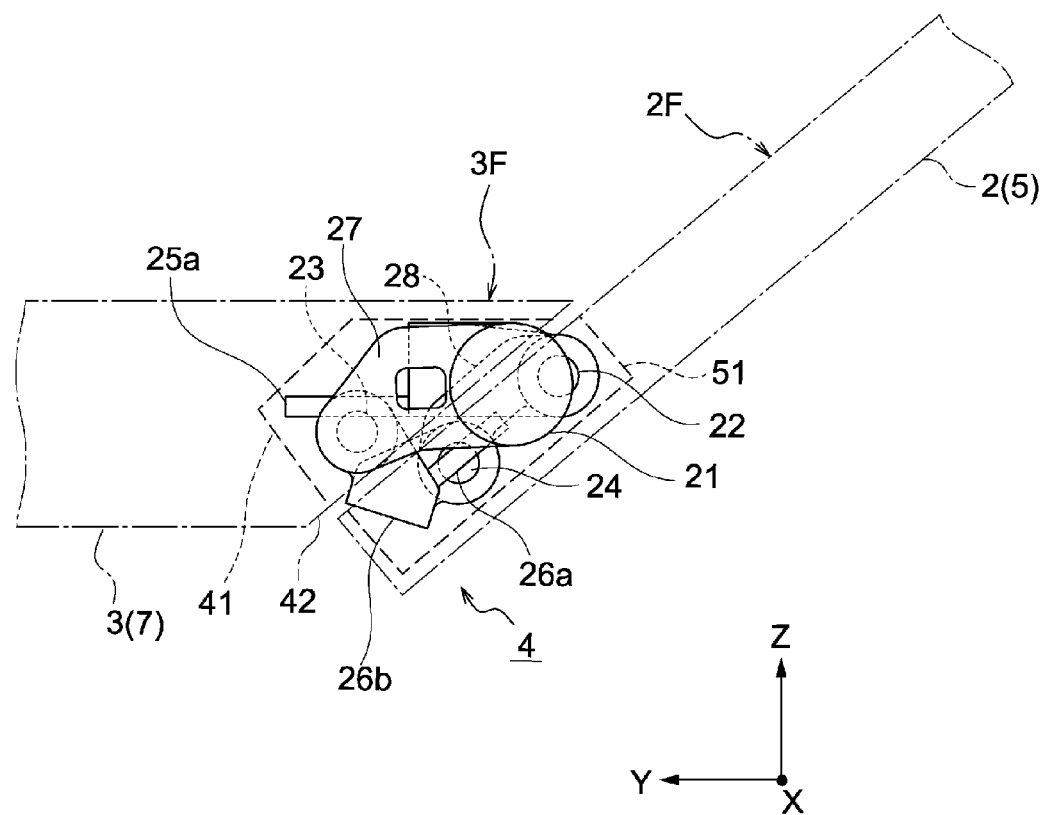
FIG. 5E is a side elevational view showing the hinge mechanism in a state in which the display section of the information processing apparatus of FIG. 1 is fully open.
Figure 6:
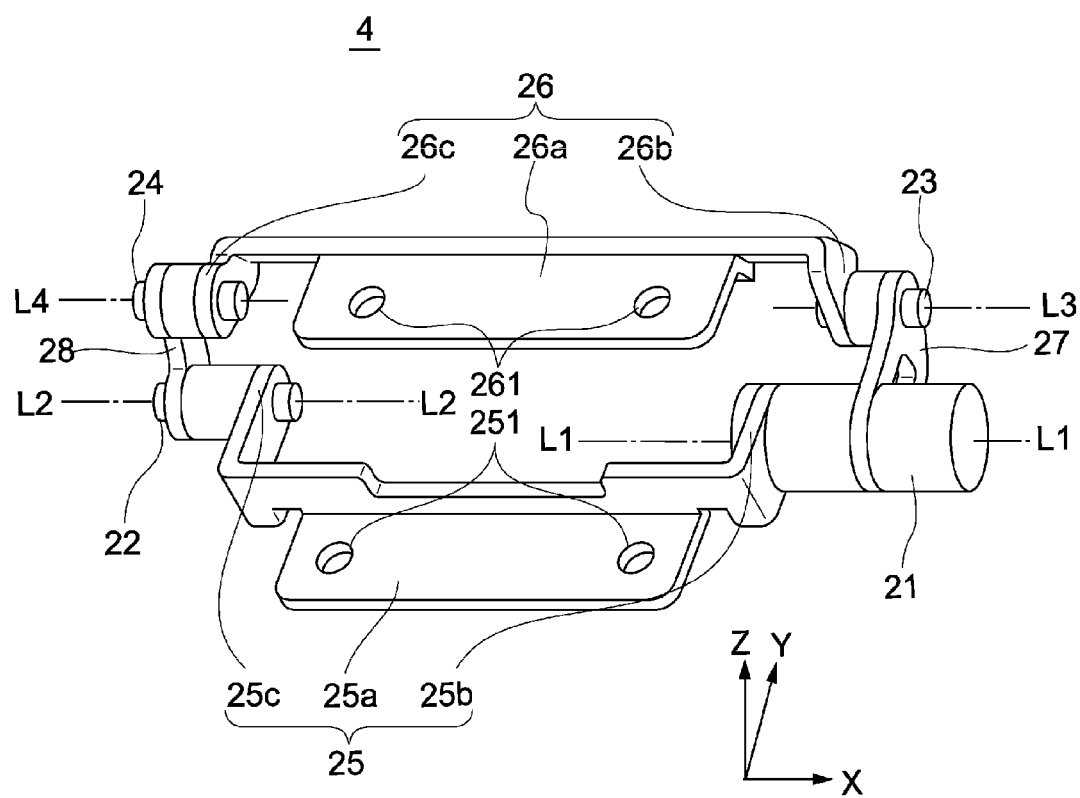
FIG. 6 is a perspective view of the hinge mechanism of FIGS. 5A to 5E.
Figure 7:
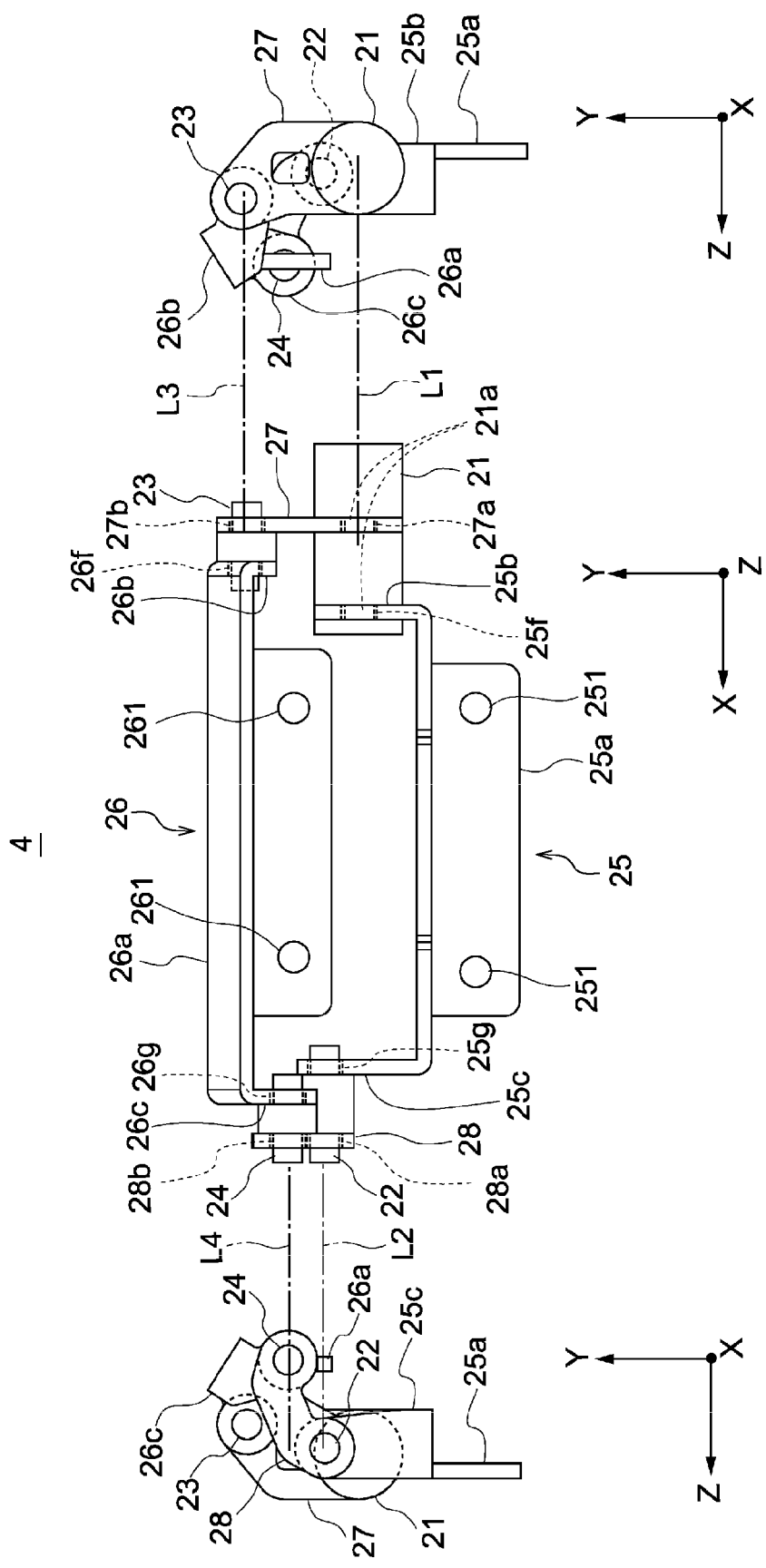
FIG. 7 is a plan view and the opposite side elevational views of the hinge mechanism of FIGS. 5A to 5E.

FIGS. 5A to 5E show the hinge mechanism 4 in side elevation and FIG. 6 shows the hinge mechanism 4 in perspective. Further, FIG. 7 shows the hinge mechanism 4 in top plan and opposite side elevations.

Referring to FIGS. 5A to 7, the hinge mechanism 4 includes a first shaft 21, a second shaft 22, a third shaft 23, a fourth shaft 24, a first fixing bracket 25, a second fixing bracket 26, a first arm 27 and a second arm 28. The first shaft 21, second shaft 22 and first fixing bracket 25 cooperatively form a first shaft structure. The third shaft 23, fourth shaft 24 and second fixing bracket 26 cooperatively form a second shaft structure. The first arm 27 and the second arm 28 cooperatively form a shaft connection section.

(First Shaft Structure)

The first fixing bracket 25 includes a first bracket base 25a, a first shaft holding portion 25b, and a second shaft holding portion 25c.

The first bracket base 25a has a plurality of screw holes 251 provided therein in a corresponding relationship to individual screw holes provided in the first hinge fixing portion 43 of the main body section 3 as seen in FIGS. 6 and 7. The first bracket base 25a is secured to the first hinge fixing portion 43 provided in the first hinge accommodating portion 41 of the main body section 3 by means of screws 44 shown in FIG. 5A. Consequently, the first fixing bracket 25 is secured to the main body section 3 to establish connection between the hinge mechanism 4 and the main body section 3.

The first shaft holding portion 25b and the second shaft holding portion 25c are provided at the opposite ends in the X axis direction of the first bracket base 25a. The first shaft holding portion 25b and the second shaft holding portion 25c project in a direction perpendicular to the X axis direction from the first bracket base 25a such that they are opposed to each other in the X axis direction. The first shaft holding portion 25b has a shaft hole 25f provided therein for holding a reduced diameter portion 21a of the first shaft 21 for rotation as seen in FIG. 7. Similarly, the second shaft holding portion 25c has a shaft hole 25g provided therein for holding the second shaft 22 for rotation as seen in FIG. 7.

A first straight line L1 which passes the axis of the first shaft 21 and a second straight line L2 which passes the axis of the second shaft 22 extend in parallel to each other and are spaced from each other in the Y-Z axis space.

(Second Shaft Structure)

Now, the second fixing bracket 26 is described.

The second fixing bracket 26 includes a second bracket base 26a, a third shaft holding portion 26b and a fourth shaft holding portion 26c.

The second bracket base 26a has a plurality of screw holes 261 provided therein in a corresponding relationship to individual screw holes provided in the second hinge fixing portion 52 of the display section 2 as seen in FIGS. 6 and 7. The second bracket base 26a is secured to the second hinge fixing portion 52 provided in the second hinge accommodating portion 51 of the display section 2 by means of screws not shown. Consequently, the second fixing bracket 26 is secured to the display section 2 to establish connection between the hinge mechanism 4 and the display section 2.

The third shaft holding portion 26b and the fourth shaft holding portion 26c are provided at the opposite ends in the X axis direction of the second bracket base 26a. The third shaft holding portion 26b and the second fixing bracket project in a direction perpendicular to the X axis direction from the second bracket base 26a such that they are opposed to each other in the X direction. The third shaft holding portion 26b has a shaft hole 26f provided therein for holding the third shaft 23 for rotation as seen in FIG. 7. Similarly, the fourth shaft holding portion 26c has a shaft hole 26g provided therein for holding the fourth shaft 24 for rotation as seen in FIG. 7.

A straight line L3 which passes the axis of the third shaft 23 and a straight line L4 which passes the axis of the fourth shaft 24 extend in parallel to each other and are spaced from each other in the Y-Z axis space.

(Shaft Connection Section)

The first fixing bracket 25 and the second fixing bracket 26 are connected to each other by the first arm 27 and the second arm 28. More particularly, the first arm 27 connects the reduced diameter portion 21a of the first shaft 21 held by the first shaft holding portion 25b of the first fixing bracket 25 and the third shaft 23 held by the third shaft holding portion 26b of the second fixing bracket 26 to each other. The first arm 27 has a pair of shaft holes 27a and 27b in which the reduced diameter portion 21a of the first shaft 21 and the third shaft 23 are inserted to hold them for rotation as seen in FIG. 7, respectively. Meanwhile, the second arm 28 connects the second shaft 22 held by the second shaft holding portion 25c of the first fixing bracket 25 and the fourth shaft 24 held by the fourth shaft holding portion 26c of the second fixing bracket 26 to each other. The second arm 28 has a pair of shaft holes 28a and 28b provided therein for receiving the second shaft 22 and the fourth shaft 24 to hold them for rotation as seen in FIG. 7, respectively.

Here, a positional relationship among the four shafts, that is, the first shaft 21, second shaft 22, third shaft 23 and fourth shaft 24, is described.

The axes of the four shafts 21 to 24 are all directed in the X axis direction which is a horizontal direction of the display face of the display section 2 in the X, Y and Z reference directions of the information processing apparatus 1. The positions of the axes of the first shaft 21 and the second shaft 22 held on the first fixing bracket 25 are displaced from each other in the Y-Z axis plane. Also the positions of the axes of the third shaft 23 and the fourth shaft 24 held on the second fixing bracket 26 are displaced from each other in the Y-Z axis plane. As a result, the positions of the axes of all of the four shafts 21 to 24 are displaced from one another. Here, the positions of the axes of the four shafts 21 to 24 are selected such that a desired locus of pivotal motion of the display section 2 is obtained.

FIGS. 5A to 5E illustrate a process of the display section 2 being pivoted with respect to the main body section 3. In particular:

FIG. 5A shows the display section 2 in a closed state;

FIG. 5B shows the display section 2 in a state at a point of time at which it begins to be opened from the closed state;

FIG. 5C shows the display section 2 in a state in which it is pivoted to an upright position by an angle of approximately 90 degrees with respect to the main body section 3;

FIG. 5D shows the display section 2 in a state pivoted by an angle greater than approximately 90 degrees with respect to the main body section 3; and FIG. 5E shows the display section 2 in a fully open state.

As seen from FIGS. 5A to 5E, the hinge mechanism 4 adopted in the present embodiment allows the display section 2 to pivot in such a manner that the display section 2 draws a predetermined locus in the Y-Z axis space.

FIG. 8 illustrates the locus of pivotal motion of the display section 2.

Referring to FIG. 8, the position of the axis of the display section 2 is denoted by P1; the position of the axis of the second shaft 22 is denoted by P2; the position of the axis of the third shaft 23 is denoted by P3; and the position of the axis of the fourth shaft 24 is denoted by P4. Since the first shaft 21 and the third shaft 23 are connected to each other by the first arm 27, in the process of the pivotal motion of the display section 2, the axis position P3 moves such that it draws a locus of a first circle denoted by C1 and centered at the axis position P1 of the first shaft 21. Meanwhile, since the second shaft 22 and the fourth shaft 24 are connected to each other by the second arm 28, in the process of the pivotal motion of the display section 2, the axis position P4 of the fourth shaft 24 moves in such a manner as to draw a locus of a second circle denoted by C2 and centered at the axis position P2 of the second shaft 22.

Since the axis positions P1 and P2 are set in a displaced relationship from each other and the distance L13 between the axis positions P1 and P3 and the distance L24 between the axis positions P2 and P4 are set different from each other, the first circle C1 and the second circle C2 are circles of different radii whose centers are displaced from each other. Thus, the locus of the pivotal motion and the posture for each pivoted position of the display section 2 can be controlled by selection of the positions and the sizes of the two circles C1 and C2.

In particular, in FIG. 8, line segments denoted by A0 to A5 are imaginary lines interconnecting the axis position P3 of the third shaft 23 and the axis position P4 of the fourth shaft 24 on the display section 2 side upon pivotal motion of the display section 2. The positions of the imaginary lines A0 to A5 indicate the positions of the display section 2 in the Y-Z axis space, and the gradients of the imaginary lines A0 to A5 indicate the postures of the display section 2, that is, the gradients of the display section 2 in the Y-Z axis space.

In particular, the line segment A0 indicates the imaginary line when the display section 2 is in a closed state as seen in FIG. 5A;

the line segment A1 indicates the imaginary line when the display section 2 is in a state at a point of time at which it begins to be opened from the closed state as seen in FIG. 5B;

the line segment A3 indicates the imaginary line when the display section 2 is in a state in which it is pivoted to an upright position by an angle of approximately 90 degrees with respect to the main body section 3 as seen in FIG. 5C;

the line segment A4 indicates the imaginary line when the display section 2 is in a state pivoted by an angle greater than approximately 90 degrees with respect to the main body section 3 as seen in FIG. 5D; and the line segment A5 indicates the imaginary line when the display section 2 is in a fully open state as seen in FIG. 5E.

Now, characteristics of the locus of pivotal motion of the display section 2 are described.

1. In a typical hinge structure wherein a shaft on the main body side and a shaft on the display section side are provided coaxially, the center of pivotal motion of the display section is not displaced in the Y-Z axis direction at all. In contrast, in the information processing apparatus 1 of the present embodiment, since the hinge mechanism 4 connects the shafts 21 and 22 on the main body section 3 side and the shafts 23 and 24 on the display section 2 side by means of the arms 27 and 28, the center of pivotal motion of the display section 2 can be displaced in the Y-Z axis directions in the process of pivotal motion of the display section 2 (characteristic 1 of the locus of pivotal motion).

2. As seen from FIGS. 5A to 5C, within a period of pivotal motion until the display section 2 is erected uprightly from its closed state, the display section 2 passes a spaced position from an upper end, that is, an interior side end of the upper face, of the rear face 42 of the main body section 3 such that it bypasses the upper end (characteristic 2 of the locus of pivotal motion). Consequently, the main body section 3 can be structured such that a part of the hinge mechanism 4 on the main body section 3 side is connected to a part of the hinge mechanism 4 on the display section 2 only on the rear face side of the main body section 3. In other words, the hinge mechanism 4 can be configured such that it is not exposed to an upper face or first face 3F of the main body section 3 as seen in FIG. 1. Since the hinge mechanism 4 is not exposed to the upper face of the main body section 3, it cannot be observed from the user who is utilizing the information processing apparatus 1, and the sense of quality of the entire information processing apparatus 1 is enhanced. Further, since the necessity for the provision of a space for exposing the hinge mechanism 4 on the upper face 3F of the main body section 3 can be eliminated, the space in which different parts such as an LED lamp or a button are to be exposed can be increased. Consequently, the degree of freedom in design of an information processing apparatus for which miniaturization is demanded can be enhanced.

3. As seen in FIGS. 5A to 5C, within the period of pivotal motion until the display section 2 is erected uprightly from its closed state, the display section 2 passes a spaced position from an upper end of the rear face 42 of the main body section 3 such that it bypasses the upper end and moves down with respect to the heightwise position of the main body section 3 (characteristic 3 of the locus of pivotal motion). Consequently, as the screen comes to be observed from the user when the display section 2 is pivoted from its closed state, the portion at which the parts of the hinge mechanism 4 on the display section 2 side are provided moves down farther than the upper face 3F of the main body section 3. As a result, the parts of the hinge mechanism 4 on the display section 2 are little observed from the user during the pivotal motion. Also from this, the sense of quality of the information processing apparatus 1 can be enhanced.

4. As seen in FIGS. 5C to 5E, within a period of pivotal motion until the display section 2 is opened fully from the state in which it is erected uprightly with respect to the main body section 3, the second hinge accommodating portion 51 of the display section 2 comes close to the tapered rear face 42 of the main body section 3. Then, in a state in which the tapered rear face 42 and a face or third face 2F on the screen side of the display section 2 extend in parallel to each other and are opposed to each other, a part not shown which acts as a stopper on the main body section 3 side and another part not shown which acts as a stopper on the display section 2 side interfere with each other to restrict the pivotal motion of the display section 2. Consequently, the display section 2 is oriented in the fully open state as seen in FIG. 5E (characteristic 4 of the locus of pivotal motion).

Further, in the state in which the display section 2 is open fully as seen in FIG. 5E, the parts of the hinge mechanism 4 are accommodated in the first hinge accommodating portion 41 and the second hinge accommodating portion 51 provided on the display section 2 and the main body section 3, respectively. Therefore, the tapered rear face 42 of the main body section 3 and the face 2F on the screen side of the display section 2 are superposed with each other with a minimum clearance left therebetween without being disturbed by the parts of the hinge mechanism 4. Also by this, the design property of the information processing apparatus 1 can be enhanced.

<Modification 1>

Now, modifications to the embodiment described above are described.

Figure 9A:
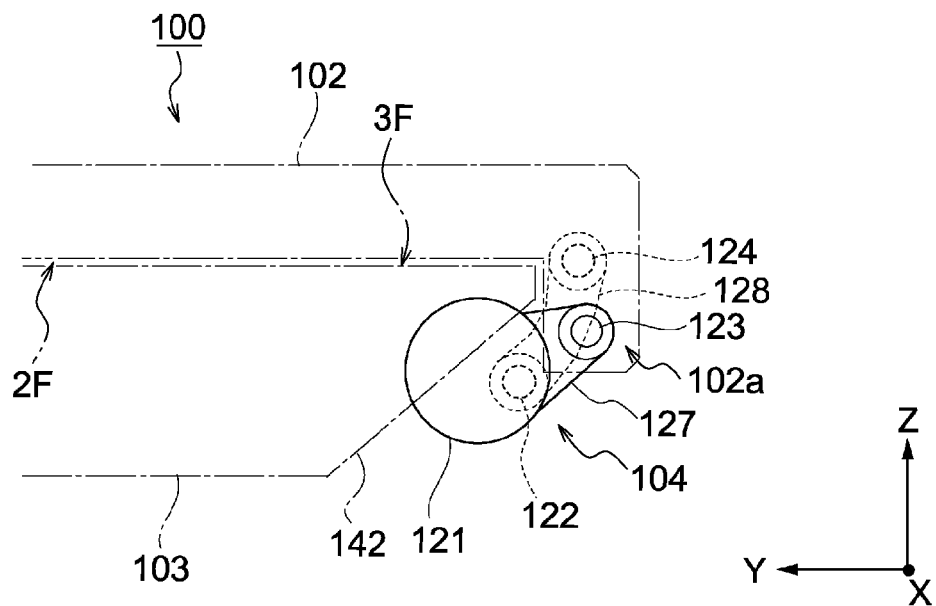
FIG. 9A is a side elevational view showing a hinge mechanism according to a modification 1 in a state in which the display section is closed.
Figure 9B:
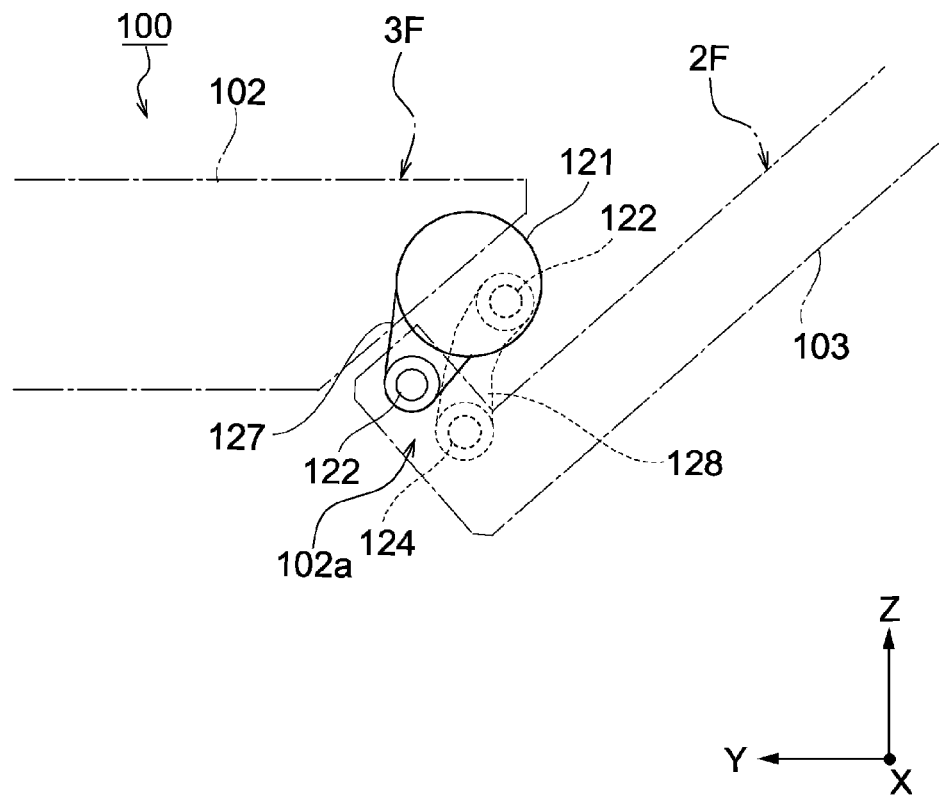
FIG. 9B is a side elevational view showing the hinge mechanism of FIG. 9A in another state in which the display section is open.

FIGS. 9A and 9B show an information processing apparatus according to a modification 1 in side elevation. Particularly, FIG. 9A shows the information processing apparatus with a display section 102 closed and FIG. 9B shows the information processing apparatus with the display section 102 opened fully.

Referring to FIGS. 9A and 9B, a hinge mechanism 104 adopted in the information processing apparatus 100 has a basically same configuration as that of the hinge mechanism 4 of the embodiment described above.

In particular, the hinge mechanism 104 of the present modification 1 includes a first shaft 121, a second shaft 122, a third shaft 123, a fourth shaft 124, a first fixing bracket not shown, a second fixing bracket not shown, a first arm 127, and a second arm 128. The parts mentioned correspond to the parts of the same names in the hinge mechanism 4 of the embodiment.

The hinge mechanism 104 of the present modification is different in the following points from the hinge mechanism 4 of the embodiment.

In particular, the display section 102 has a portion 102a projecting from the screen thereof. The projecting portion 102a accommodates therein parts of the hinge mechanism 104 on the display section 102 side such as, for example, the third shaft 123, fourth shaft 124, second fixing bracket not shown and so forth.

Also by the configuration described, the center of pivotal motion of the display section 102 can be displaced in the Y-Z axis space during the process of pivotal motion of the display section 102. Further, when the display section 102 is opened, since the display section 102 passes a spaced position from an upper end of the rear face 142 of the main body section 103 such that it bypasses the upper end, the hinge mechanism 104 can be structured such that the parts thereof on the main body section 103 side are connected to the parts of the hinge mechanism 104 of the display section 102 side only on the rear face side of the main body section 103.

Further, since the hinge mechanism 104 is not exposed to the upper face 3F of the main body section 103, the hinge mechanism 104 is not observed from the user who is utilizing the information processing apparatus 100. Consequently, the sense of quality of the entire information processing apparatus 100 is enhanced. Further, since the space in which the hinge mechanism 104 is to be exposed on the upper face 3F of the main body section 103 can be eliminated, the space in which different parts such as an LED lamp or a button are to be disposed can be increased. Consequently, the degree of freedom in design of the information processing apparatus 100 for which miniaturization is demanded can be enhanced.

Further, within the period of pivotal motion until the display section 102 is erected uprightly from its closed state, the display section 102 passes a spaced position from an upper end of the rear face 142 of the main body section 103 such that it bypasses the upper end and moves down with respect to the heightwise position of the main body section 103. Consequently, as the screen comes to be observed from the user when the display section 102 is pivoted from its closed state, the portion at which the parts of the hinge mechanism 104 on the display section 102 side are provided moves down farther than the upper face 3F of the main body section 103. As a result, the parts of the hinge mechanism 104 on the display section 102 are little observed from the user during the pivotal motion. Also from this, the sense of quality of the information processing apparatus 100 can be enhanced.

<Modification 2>

Now, another modification to the hinge mechanism is described.

Figure 10:
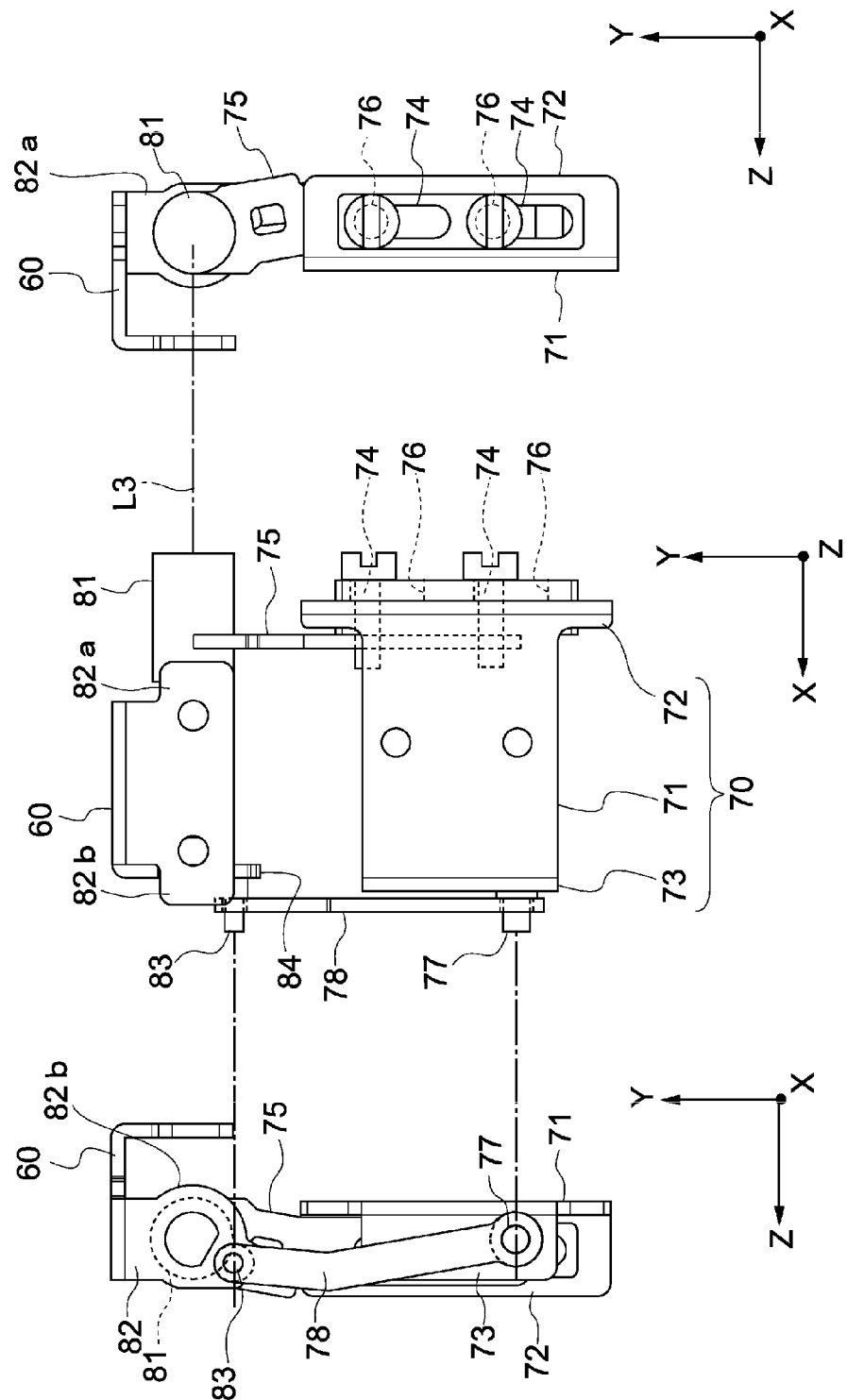
FIG. 10 is a plan view and the opposite side elevational views of a hinge mechanism according to a modification 2.

FIG. 10 shows a hinge mechanism according to a modification 2 in front elevation and opposite side elevations. FIG.

11 shows the hinge mechanism in a state in which the display section is closed and another state in which the display section is fully open.

Figure 11:
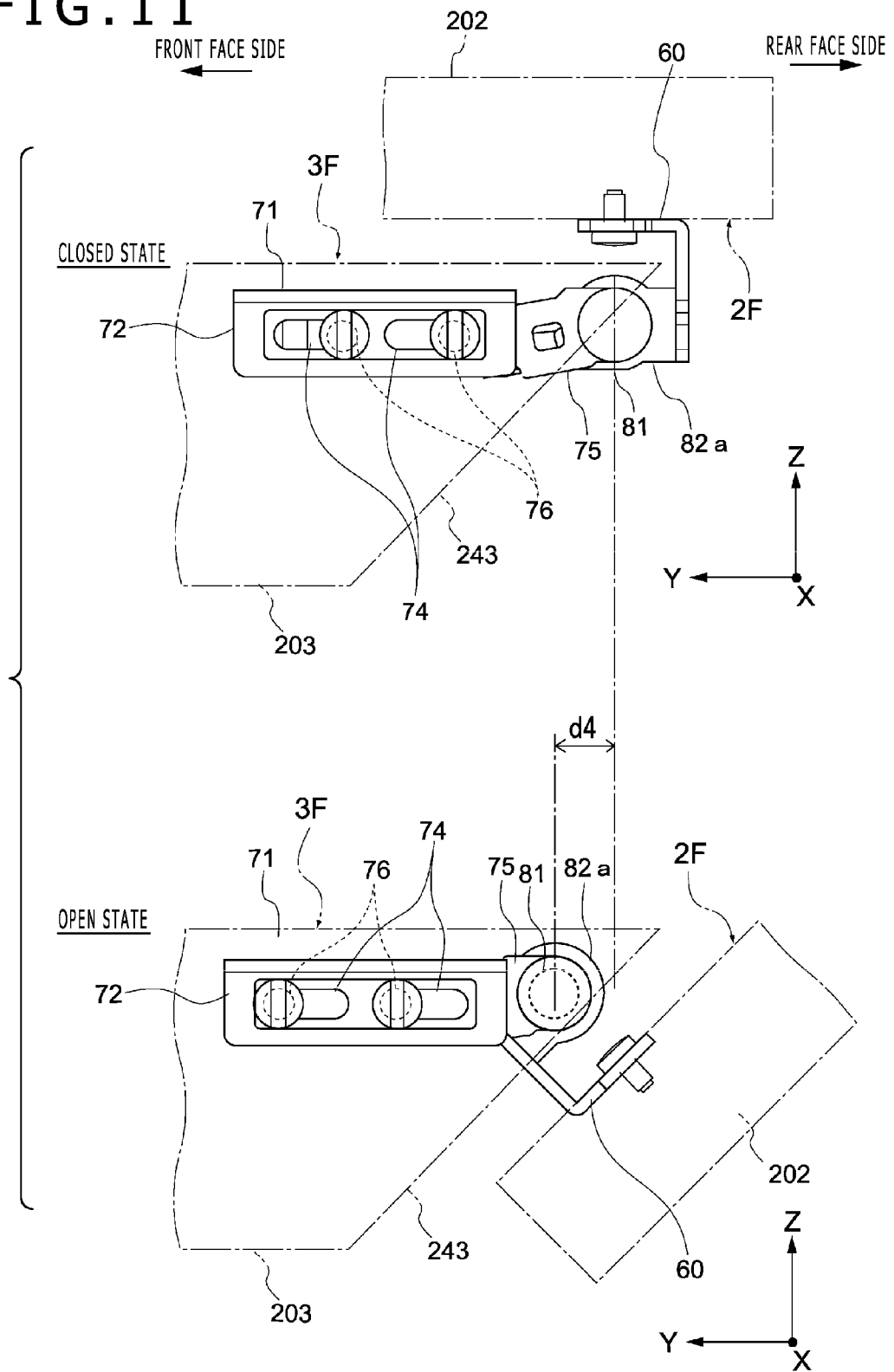
FIG. 11 is side elevational views of the hinge mechanism of FIG. 10 in a state in which the display section is closed and another state in which the display section is fully open, respectively.

Referring to FIGS. 10 and 11, the hinge mechanism 204 according to the modification 2 includes a first fixing bracket 70 secured to a main body section 203, and a second fixing bracket 60 secured to a display section 202.

The first fixing bracket 70 has a first bracket base 71 secured to the main body section 203. A pair of side wall portions 72 and 73 are provided at the opposite ends in the X axis direction of the first bracket base 71 in such a manner as to stand uprightly in the Z axis direction. The side wall portion 72 has an elongated hole 74 provided therein and having a recess in the Y axis direction. An insertion pin provided uprightly on a slider 75 is inserted in the elongated hole 74. Thus, the insertion pin 76 is movable in the Y axis direction in the elongated hole 74 so that the slider 75 can move within the elongated hole 74 in the Y axis direction. The other side wall portion 73 has an A shaft 77 provided thereon such that it projects in the X axis direction. An arm 78 is secured at one end portion thereof to the A shaft 77.

Meanwhile, a pair of B shaft holding portions 82a and 82b are provided on a second fixing bracket 60 secured to the display section 202 such that they pivotably hold a B shaft 81 at two positions spaced from each other in the axial direction of the B shaft 81. The slider 75 is supported at one end thereof on the B shaft 81. Further, a C shaft holding portion 84 is provided on the B shaft holding portion 82b and rotatably holds a C shaft 83. The B shaft 81 and the C shaft are held by the holding portions 82a, 82b and 84, respectively, in such directions that the axial lines thereof extend along the X axis direction. The position of the axis of the C shaft 83 is positioned in an offset relationship from the position of the axis of the B shaft 81.

In particular, in the hinge mechanism 204, 1. the display section 202 is supported on the second fixing bracket 60 such that it can be pivoted around the touch pad section 8;

2. the C shaft 83 is positioned such that it is offset from the position of the axis of the B shaft 81 in both of the Y axis direction and the Z axis direction, and the arm supported at one end portion thereof on the A shaft 77 having an axis whose position is fixed is supported at the other end portion thereof on the C shaft 83; and 3. the slider 75 supported at one end thereof on the B shaft 81 is provided for movement in the Y axis direction in the elongated hole 74.

From the configurations, if the display section 202 is pivoted, then the position of the axis of the B shaft 81 moves in such a manner as to draw a predetermined locus in the Y-Z axis space. Details of this are described below.

FIG. 12 illustrates operation of the hinge mechanism 204 when the display section 2 is opened in side elevation and illustrates a variation of the state of the hinge mechanism 204 from the side on which the arm 78 can be seen, that is, from the leftwardly and rightwardly opposite side to that in FIG. 11.

Referring to FIG. 12, in a state in which the display section 2 is closed, that is, in an initial state 1, the C shaft 83 is positioned in an offset relationship in the Y axis direction and the Z axis direction from the position of the axis of the B shaft 81. More particularly, the C shaft 83 is offset to the front face side of the information processing apparatus in the Y axis direction with respect to the position of the axis of the B shaft 81 and is offset to the bottom face side of the information processing apparatus in the Z axis direction with respect to the position of the axis of the B shaft 81.

If opening movement of the display section 2 is started from the closed state, then the position of the axis of the C shaft 83 moves along a locus of pivotal motion of the B shaft 81 and the display section 2 moves together with the second fixing bracket 60, B shaft 81 and C shaft 83 by a distance d1 in the maximum in the Y axis direction on the rear face side of the information processing apparatus side (state 2).

As the display section 2 is opened further, the position of the axis of the C shaft 83 further moves along the locus of pivotal motion of the B shaft 81 and the display section 2 moves together with the B shaft 81 and the C shaft toward the front face side of the image processing apparatus reversely from that within the transition period from the initial state 1 to the state 2 (state 3-state 5).

Finally, a state 6 in which the face 2F on the screen side of the display section 2 is superposed with the tapered rear face 243 of the main body section 3 with a minimum clearance left therebetween is established to restrict pivotal motion of the display section 2 as seen from the open state of FIG. 11. It is to be noted that reference characters d2, d3 and d4 in the states 4, 5 and 6 of FIG. 12 indicate amounts of movement of the position of the axis of the B shaft 81 from the initial state 1 toward the front face side, and have a relationship of d2<d3<d4.

Also with the hinge mechanism 204 according to the modification 2 having the configuration described above, the center of pivotal motion of the display section 202 can be displaced in the Y-Z axis space in the process of pivotal motion of the display section 202. Further, when the display section 202 is opened, since the display section 202 passes a spaced position from an upper end of the rear face 243 of the main body section 203 such that it bypasses the upper end, the hinge mechanism 204 can be structured such that the parts thereof on the main body section 203 side are connected to the parts of the hinge mechanism 204 of the display section 202 side only on the rear face side of the main body section 203.

Further, since the hinge mechanism 204 is not exposed to the upper face of the main body section 203, the hinge mechanism 204 is not observed from the user who is utilizing the information processing apparatus. Consequently, the sense of quality of the entire information processing apparatus is enhanced. Further, since the space in which the hinge mechanism 204 is to be exposed on the upper face of the main body section 203 can be eliminated, the space in which different parts such as an LED lamp or a button are to be disposed can be increased. Consequently, the degree of freedom in design of the information processing apparatus for which miniaturization is demanded can be enhanced.

While a preferred embodiment of the disclosed technique has been described using specific terms, such description is for illustrative purposes only, and it is to be understood that changes and variations may be made without departing from the spirit or scope of the following claims.

What is claimed is:

1. An information processing apparatus, comprising:
a main body section having a first face defined by a plurality of sides and having a keyboard disposed thereon and a second face which shares one of the sides of said first face;
a display section having a third face on which a screen is disposed; and
a hinge mechanism including a first shaft structure provided in an exposed state on said second face of said main body section, a second shaft structure provided on said display section and a shaft connection section adapted to connect said first shaft structure and said second shaft structure to each other, said hinge mechanism pivotably connecting said display section to said main body section between a first position at which said third face of said display section is opposed to said first face of said main body section and a second position at which said third face is inclined by a first predetermined angle with respect to said first face such that the center of the pivotal motion of said display section varies in response to the pivotal motion of said display section, said first shaft structure includes a first shaft and a second shaft having axes whose positions are displaced from each other, said second shaft structure includes a third shaft and a fourth shaft having axes whose positions are displaced from each other, said shaft connection section includes a first arm adapted to connect said first shaft and said third shaft to each other and a second arm adapted to connect said second shaft and said fourth shaft to each other, and the distance between the axes of said first shaft and said second shaft and the distance between the axes of said second shaft and the fourth shaft are different from each other, and the axes of the first shaft, the second shaft, the third shaft and the fourth shaft are positioned so as to obtain a desired locus of pivotal motion of the display section, said desired locus of pivotal motion obtained from a first circle having a first radius and centered at an axis position of the first shaft and a second circle having a second radius and centered at an axis position of the second shaft, in which the first radius is different from the second radius.

2. The information processing apparatus according to claim 1, wherein said second face of said main body section is a tapered face which retreats as the distance from said first face increases, and when said display section is at the second position, said third face is opposed in a parallel relationship to the tapered face.

3. The information processing apparatus according to claim 1, further comprising a first accommodating portion provided on said second face of said main body section and a second accommodating portion provided on said third face of said display section, said first accommodating portion and said second accommodating portion being adapted to cooperate, when said display section is at the second position, with each other to form one space in which said first shaft structure, second shaft structure and shaft connection section are accommodated.

* * * * *